3,342,787
RESINOUS COMPOSITIONS
Irving E. Muskat, Miami, Fla., assignor, by mesne assignments, to Sinclair Research, Inc., a corporation of Delaware
No Drawing. Filed Aug. 8, 1961, Ser. No. 129,981
8 Claims. (Cl. 260—78.5)

The present invention relates to very low molecular weight partial esters of copolymers of monovinyl aromatic compounds, especially styrene, with maleic compounds to provide products which possess greatly improved solubility in aqueous alkaline medium to provide aqueous solutions of lower solution viscosity or higher resin solids content. The invention includes the new partial esters per se, new and improved methods for producing the same, and also the aqueous alkaline solutions which are produced therefrom.

Copolymers of styrene and maleic compounds including maleic anhydride, maleic esters and maleic partial esters are known, but these possess only limited solubility in aqueous alkaline media, typified by water solutions of ammonium hydroxide, and concentrated low viscosity solutions are not obtainable from these known copolymers. If a substantial portion of the carboxyl groups available in the copolymer are esterified with alcohols, the number of carboxyl groups available to participate in solubilization is still further reduced. Still further, as the proportion of styrene or other monovinyl aromatic compound in the compolymer is increased, available carboxyl reactivity is decreased and solubility in aqueous alkaline medium is, again, made more difficult. The invention includes the provision of aqueous alkaline-soluble partial esters of low molecular weight copolymers in which the molar ratio of styrene, for example, to maleic compound is in excess of 1:1.

From the standpoint of known heteropolymers of maleic anhydride and styrene, even without partial esterification, these have not been sufficiently soluble to make solutions containing more than 40% heteropolymer, regardless of solution viscosity. In the invention, water solutions are provided which contain far more than 40% of dissolved styrene-maleic anhydride copolymer. Indeed, liquid solution products may be obtained which contain at the anhydride copolymer having a solution viscosity in 10% acetone solution of 0.65 centistoke or its 50% or 100% half ester with butyl Cellosolve dissolved in aqueous ammonium hydroxide up to a concentration of 60–70% by weight, based on dissolved resin solids.

The invention resides primarily upon the discovery that partial esters of copolymers of vinyl aromatic compounds and maleic compounds of very low molecular weight, e.g., those possessing a solution viscosity of up to 2.0 centistokes and especially those possessing a solution viscosity of up to 1.0 centistoke in a solution of 10 grams of copolymer diluted to 100 milliliters of solution with acetone, can be esterified with monohydroxy organic compounds, especially monohydric aliphatic alcohol containing up to 16 carbon atoms in the carbon chain which carries the single hydroxyl group, to provide partial esters which possess improved chemical resistance and which are internally plasticized while, at the same time, retaining sufficient residual carboxyl reactivity to be extensively soluble in water in the presence of water soluble alkaline agents, typically ammonium hydroxide.

The art has also experienced difficulty in the production of partial esters of maleic compound-containing copolymers because the esterification reaction in the absence of catalysis does not, in many instances, proceed to a sufficient extent. Moreover, conventionally used esterification catalysts are injurious to the ester product requiring purification to eliminate catalyst residues.

It has been found that metal salts of fatty acids, and especially the alkali metal salts, are effective esterification catalysts to promote the rapid and complete reaction of carboxyl-containing copolymer and alcohol to any extent desired and even in the absence of extraneous solvent, and that these salts do not injure the ester product for many uses so that purification of the product becomes unnecessary.

As previously indicated, the partially esterified copolymers of the invention are copolymers of maleic compounds with monovinyl aromatic monomers. Desirably, the copolymer is first formed by copolymerizing the monovinyl aromatic monomer with a maleic anhydride to provide an anhydride copolymer which is then partially esterified with a suitable alcohol.

The term "maleic anhydride" identifies anhydrides having the formula:

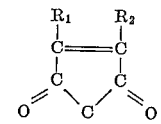

in which $R_1$ and $R_2$ are selected from the group of hydrogen, alkyl, aryl and aralkyl radicals containing up to 8 carbon atoms, and halogen. Thus, maleic anhydride, methyl maleic anhydride, phenyl maleic anhydride, dimethyl maleic anhydride and chlormaleic anhydride are particularly contemplated. Maleic anhydride is preferred.

Various vinyl aromatic monomers may be used, especially styrene and vinyl toluene, but other substituted styrenes may be used such as ring-alkylated styrene compounds such as the vinyl xylenes, and p-isopropyl styrene, these being illustrative of $C_1$—$C_4$ alkyl-substituted products. Halogen-substituted styrenes may also be used in which up to five of the nuclear hydrogen atoms are replaced by chlorine, fluorine or other halogen. Vinyl naphthalene may also be used.

The preferred starting copolymers are low molecular weight copolymers of styrene and maleic anhydride in molar proportions of from 1:1 to 5:1, preferably from 1:1 to 3.0:1. These copolymers contain an average of at least two anhydride groups per molecule. By low molecular weight is meant copolymers, especially those of styrene and maleic anhydride having a solution viscosity in 10% solution in acetone of up to 2.0 centistokes, preferably up to 1.0 centistoke, and most preferably up to 0.7 centistoke. All solution viscosities are measured at 30° C. and a 10% solution designates 10 grams of copolymer dissolved in acetone to form 100 milliliters of solution.

The preferred copolymers may be terminated by a chain terminating solvent which may be an alkyl-substituted aromatic organic compound in which the alkyl-substituent provides an active hydrogen atom. Desirably, the alpha carbon atom is hydrogen-substituted as in an isopropyl substituted benzene. In case of ketone solvents, the terminating group may contain the ketone radical.

A more extensive description of preferred low molecular weight copolymers useful as bas or starting copolymers in accordance with the invention and production thereof is contained in my copending applications Ser. Nos. 849,706 and 849,704, both filed Oct. 30, 1959, and these disclosures are hereby incorporated by reference application Ser. No. 849,706 is now United States Patent 3,085,994. A more extensive description of preferred low molecular weight copolymers containing larger proportions of styrene is contained in my copending application Ser. No. 129,990 filed of even date herewith.

The copolymers which are produced contain a plurality (at least two) of maleic anhydride residues which are subject to esterification, each anhydride group being capable of forming a pair of ester groups upon reaction with monohydroxy compounds, especially monohydric aliphatic alcohol. Since there are usually several anhydride groups per copolymer molecule, the extent of esterification may be expressed as a percentage of half esterification. Thus, esterification of 1 equivalent of anhydride in the copolymer with 0.5 mol of alcohol provides a 50% half-ester; esterification with 1 mol of alcohol provides a 100% half-ester; esterification with 1.5 mols of alcohol provides 150% of half-esterification; and esterification with 2 mols of alcohol provides 200% of half-esterification (the bis-ester).

While the partially esterified copolymers employed in the invention are preferably produced by partial esterification of anhydride copolymers, it is possible, though less preferred, to provide the partial esters directly through copolymerization with the monovinyl aromatic compound of a mixture of the desired maleic half or bis-esters and maleic acid or anhydride. Of course, the conditions of copolymerization must be selected to provide copolymers having the low molecular weight essential to the invention.

Similarly, partially esterified copolymers useful in the invention may be produced by copolymerizing the maleic compound with the vinyl aromatic compound copolymerizable therewith in the presence of the esterifying alcohol, conveniently in the presence of the desired proportion of esterifying alcohol. The copolymerization in the presence of alcohol proceeds more satisfactorily than direct copolymerization of the monomers including maleic esters. In this reaction it appears that at least some of the esterification occurs after copolymerization has been completed.

Since the low molecular weight anhydride copolymers may include significant proportions of chemically bound terminating solvent, the anhydride content of the copolymer should be determined by accurate titration and not estimated from the proportions of reactants used in making the copolymer.

While any monohydric alcohol including aromatic monohydric compounds, such as phenol, may be used, it is preferred to employ aliphatic alcohols and especially those containing at least 3 carbon atoms in the molecule. While long chain aliphatic alcohols have been used, it is preferred to use a monohydric aliphatic alcohol containing up to 16 carbon atoms in the carbon chain which carries the single hydroxyl group. Monohydric aliphatic alcohols containing at least 3 carbon atoms and from 2-12 carbon atoms in the carbon chain which carries the single hydroxyl group are particularly preferred. Of course, these alcohols may be employed alone or in admixture with one another. While methyl and ethyl alcohols are operative, they are not preferred. The alcohol which is used provides an important plasticizing function and methyl and ethyl alcohols are less satisfactory from this standpoint. On the other hand, long chain aliphatic alcohols produce copolymer esters which are less extensively soluble in aqueous alkaline medium than copolymer esters with short chain aliphatic alcohols. Polyether alcohols are also useful such as the monomethyl and monobutyl ether polyoxyalkylene glycols illustrated by methoxy polyethylene glycol having a molecular weight in excess of 250, more specifically 300–400.

Among the aliphatic monohydric alcohols containing from 2 to 12 carbon atoms in the aliphatic carbon chain carrying the single hydroxyl group, one may desirably select saturated hydrocarbon radicals containing from 4–8 carbon atoms. These are preferably primary alcohols, including straight chain and branched chain alcohols, but tertiary and secondary alcohols as well as cyclic alcohols may be less desirably selected. Of particular value are aliphatic ether alcohols in which hydrocarbon radical between the ether oxygen and the hydroxyl oxygen contains from 2–6 carbon atoms. The specific nature of the etherifying group remote from the single hydroxyl group is not of primary signficance. To illustrate the alcohols which may be used to provide plasticizing characteristics while retaining high solubility in aqueous alkaline medium; preferred alcohols are n-amyl alcohol, 1-butanol, isobutanol, 2-ethyl butanol, butyl Cellosolve, butyl Carbitol and tetrahydrofurfuryl alcohol. Butyl Cellosolve is outstanding and is particularly preferred. Other alcohols which may be selected, though these are less preferred, are 1-hexanol, Cellosolve, phenyl Cellosolve, Carbitol, butoxy ethoxy propanol, 2-ethylhexanol and cyclohexanol. The monovalent radical carrying the hydroxyl group may even contain halogen, nitrogen, sulfur or phosphorus atoms. Thus, halogenated derivatives may be used, as far example, chlorinated or fluorinated isobutanol. Nitrogen-containing monohydroxy organic compounds which may be used are illustrated by tertiary amino alcohols such as N,N-dimethyl ethanol amine. Sulfur-containing monohydroxy compounds which may be used are illustrated by thio ethers such as ethyl butanol sulfide. Phosphorus-containing monohydroxy compounds which may be used are illustrated by diethyl monobutanol phosphate. While saturated alcohols are preferred, saturation is not essential. Thus, unsaturated alcohols may be used such as allyl alcohol, methallyl alcohol, oleyl alcohol and linoleyl alcohol.

The extent of partial esterification is of secondary importance to the invention. As the lower extreme, partial esterification must proceed to an extent sufficient to provide at least 10% of half esterification for internal plasticizing. In most instances, but not in all instances, half esterification must greatly exceed 10% to provide desired inertness in the absence of a cross-linking cure. At the upper extreme of partial esterification, sufficient carboxyl functionality should be permitted to remain to enable solubility in aqueous alkaline medium except when polyoxyalkylene glycols are used for esterification, in which event, even the bis-ester can be placed in solution in aqueous alkaline medium.

To illustrate the ranges of partial esterification useful for different purposes, a copolymer of styrene and maleic anhydride in mol proportions of 1:1 (molecular weight of 1600), can tolerate partial esterification of up to about 145% of half esterification while retaining extensive solubility in aqueous alkaline medium. Above 145% of half esterification, solubility diminishes and the selection of the esterifying alcohol takes on added importance. Nevertheless, the copolymer esters remain soluble in aqueous alkaline medium and the solubility which is achieved is far greater than that which could hitherto be obtained. Thus, there may be place in aqueous alkaline solution copolymer partial esters having a very small residual carboxyl content and which are, therefore, substantially inert to water.

A copolymer of styrene and maleic anhydride in mol proportions of 2:1 (molecular weight of 2000), can be thermoset by reaction with glycol. Half esterification of this copolymer up to 50% and somewhat higher provides partial esters which will still thermoset with glycols. Half esterification of from 80–116% provides thermoplastic products which do not thermoset in the presence of glycols under normal molding conditions. All of these partial esters up to about 116% of half esterification are extensively soluble in aqueous alkaline medium. With still further half esterification above 116%, aqueous alkaline solubility diminishes, but dilute solutions can still be formed and are useful, especially for depositing thermoplastic films which are insensitive to water.

A copolymer of styrene and maleic anhydride in mol proportions of 3:1 (molecular weight of 1500) is still curable with glycol. Half esterification of such copolymers up to 75% and somewhat higher can be effected without destroying good solubility in aqueous alkaline medium. With still greater amounts of half esterification, aqueous alkaline solubility diminishes, but the products are still useful and soluble in aqueous alkaline solution.

It may be surprising to note the high proportions of styrene which may be present since copolymers containing 2 or more mols of styrene per mol of maleic anhydride have not previously been considered to be producible. Nevertheless, such copolymers can be prepared and are the subject of my companion application filed of even date herewith, the disclosure of which is hereby incorporated by reference.

The alkaline materials which may be used in the aqueous alkaline media in which the copolymer esters are dissolved are monovalent bases which may, desirably be selected from the group of ammonium hydroxide, lower alkyl-substituted derivatives of ammonium hydroxide, lower alkyl amines, morpholine, and alkali metal hydroxide or salt which generates the same. The specific alkaline material which is selected is not a primary feature of the invention. Ammonium hydroxide is particularly preferred. Nevertheless, the other alkaline materials noted are also useful. Suitable lower alkyl-substituted derivatives of ammonium hydroxide are monoethyl ammonium hydroxide, diethyl ammonium hydroxide, triethyl ammonium hydroxide and tetramethyl ammonium hydroxide. Among the alkali metal hydroxides, sodium hydroxide, lithium hydroxide and potassium hydroxide are illustrative and quite useful in accordance with the invention. Salts such as sodium, ammonium, lithium, potassium and carbonates and their bicarbonates which generate the corresponding hydroxides in situ may also be used. Suitable amines are ethyl amine, diethyl amine and triethyl amine. Alkanolamines are also effective. For many coating purposes, it is desired that the alkaline material used in the formation of the water soluble copolymer salt be volatile so as to be eliminatable upon application of the coating composition. In such instances, volatile nitrogenous bases are preferred, especially ammonium hydroxide.

The proportion of alkaline material required to effect dissolution will vary somewhat depending upon the specific copolymer which is selected. At the very minimum, the water solution should have a pH of at least 4.0, normally of at least 6.5 and desirably all of the carboxyl groups in the copolymer are neutralized providing a water solution having a pH in the range of from 7–9. The presence of excess alkaline material is, in general, not detrimental and the use of an excess facilitates dissolving of the copolymer although it results in a water solution of alkaline pH. The solutions are prepared by dissolving the partially esterified copolymer in water containing dissolved monovalent base. Moderate heat may be used to facilitate dissolving of the copolymer.

As will be evident, the extent of solubility and the viscosity of the solution which is produced will depend upon many factors, such as the proportion of monovinyl aromatic compound in the copolymer, the molecular weight of the copolymer, the extent of esterification and the alcohol which is selected for esterification. In preferred combinations, solubility in aqueous alkaline medium is remarkably extensive, providing solutions which are either far more concentrated than could heretofore be produced or of far lower viscosity at any given concentration of dissolved resin solids.

The invention is illustrated in the examples which follow:

*Example 1*

A kettle of 30 gallon capacity, provided with agitation equipment, a jacket adapted to provide heating or cooling and a reflux condenser was charged with approximately 7 gallons of p-cymene which was then heated to the boiling point (about 176° C.).

In a separate tank, approximately 17.6 pounds of maleic anhydride briquettes were dissolved in approximately 13 gallons of p-cymene. The maleic anhydride-p-cymene solution was heated to 53° C. and after the briquettes disappeared the solution was filtered to recover ¾ pound of insoluble maleic acid. Approximately 18.3 pounds of styrene monomer were added to the clear filtrate, representing approximately 1% excess by weight over a 1:1 molar ratio of styrene to maleic anhydride. After stirring to produce a homogeneous solution and cooling to 48° C., 390 grams of benzoyl peroxide were added and dissolved by stirring to provide approximately 2.4% benzoyl peroxide by weight of total monomers present.

The monomer-containing solution was added to the boiling p-cymene in the kettle at the rate of about 3 gallons per minute, the p-cymene solvent being maintained under active reflux. The copolymerization reaction was substantially instantaneous. After the 15 gallons of monomer-containing solution had been added, the molten mass of heteropolymer product which formed within the kettle was allowed to settle to the bottom of the kettle where it was drawn off. The molten product was allowed to cool to form a solid mass which was dried and broken up into particulate form. The yield was 111.5%, indicative of complete reaction of monomer as well as termination of the copolymer by p-cymene. The copolymer product was soluble in acetone and 10 grams of the copolymer dissolved in acetone to form 100 milliliters of solution had a viscosity of 0.72 centistoke at 30° C.

*Example 2*

The preparation of 50% and 75% half-esters of the copolymer of Example 1 and butyl Cellosolve (a particularly preferred alcohol) are easily prepared by heating the appropriate stoichiometric quantities of the styrene-maleic anhydride copolymer and butyl Cellosolve at 150° C. for 2 hours. However, 100% half-esters and higher esters are not so easily prepared. The typical use of strong acid catalysts such as sulfuric acid is effective, but the product must be purified.

The 100% half-ester is prepared by mixing one anhydride equivalent of the copolymer of Example 1 and 1 mol of butyl Cellosolve with 2.4 grams $LiC_2H_3O_2 \cdot 2H_2O$ in a 2-liter resin kettle fitted with a stirrer and reflux condenser. The mixture is heated in an oil bath at 175° C. for 2 hours. The resulting ester is then sparged with nitrogen for approximately 10 minutes. After cooling, the 100% half-ester is ground to a free-flowing powder having an acid number of 164.

*Example 3*

The 125% half-ester of the copolymer of Example 1 and butyl Cellosolve may be prepared by mixing one anhydride equivalent of the copolymer of Example 1 and 1.25 mols butyl Cellosolve with 2.62 grams

$$LiC_2H_3O_2 \cdot 2H_2O$$

in a 2-liter resin kettle fitted with a stirrer and reflux condenser. The mixture is heated in an oil bath at 175° C. for 2 hours. The resulting ester is then sparged with nitrogen for approximately 10 minutes. After cooling, the 125% half-ester is ground to a powder having an acid number of 107.

*Example 4*

The 150% half-ester of the copolymer of Example 1 and butyl Cellosolve may be prepared by mixing one anhydride equivalent of the copolymer and 1.5 mols of butyl Cellosolve with 2.84 grams $LiC_2H_3O_2 \cdot 2H_2O$ in a 2-liter resin kettle fitted with a stirrer and reflux condenser. The mixture is heated in an oil bath at 175° C. for 2 hours. The resulting ester is then sparged with nitrogen for approximately 10 minutes. After cooling, the 150% half-ester is ground to a powder having an acid number of 78.

*Example 5*

The bis-esters of the copolymer of Example 1 and various alcohols are prepared by mixing one anhydride equivalent of the copolymer and 2 mols of the alcohol with 1.5% LiC₂H₃O₂·2H₂O. The mixture is placed in a 2-liter resin kettle fitted with a stirrer, reflux water trap and condenser and heated in an oil bath at 175° C. until the water trap has collected approximately 1 mol of water and the acid number approaches zero.

Typical alcohols which have been successfully used in the preparation of bis-esters with the copolymer of Example 1 include: n-butanol, 2-ethylbutanol, 2-ethylhexanol, butyl Cellosolve, and isodecanol.

The bis-esters of the present example, while not useful in the production of aqueous akaline solutions as are the partial esters which are the primary subject of the invention, possess considerable utility, especially in organic solvent solution. The present example illustrates that 200% of half esterification is easily achieved using the catalytic esterification process by which the partial esters which are the primary subject of the invention are preferably produced. Bis-esters which are soluble in water will be illustrated hereinafter.

*Example 6*

The 50% and 100% half-esters of Example 2 and the 125% half-ester of Example 3 were each easily dissolved by agitating the same in a water solution containing 1 mol of ammonium hydroxide per equivalent of carboxyl functionality remaining in the partially esterified copolymer. Conveniently, the water solution is heated to 50° C. to facilitate dissolving of the copolymer. By adjusting the proportion of water, solutions containing from 30–75% by weight of dissolved resin solids are easily and directly produced. The 50% and 100% half-esters of Example 2 dissolve more easily and rapidly than the 125% half-ester of Example 3. Nevertheless, all of these partial ester products are extensively soluble in the aqueous alkaline medium.

To illustrate the extensive difference in the solubility of the 100% half ester of Example 2 and the 100% half esters of conventional copolymers of styrene and maleic anhydride, the 100% butyl Cellosolve half ester of a styrene/maleic anhydride copolymer (mol ratio 1/1) having a viscosity in 10% solution in acetone of 8.0 centistokes was prepared and dissolved in water containing sodium hydroxide to provide a solution containing 15% by weight of dissolved resin solids using sufficient sodium hydroxide to provide a pH of 8.0. The Brookfield viscosity measured in centipoises at 24° C. of the 15% sodium hydroxide solution of high molecular weight copolymer partial ester is 304 centipoises. The corresponding 100% half ester of Example 2 in 15% by weight solution in aqueous sodium hydroxide having a pH of 8.0 was only 8.8 centipoises, the greatly lowered viscosity demonstrating the gross improvement in aqueous alkaline solubility achieved by the invention.

To illustrate the concentrated solutions which can be formed in accordance with the invention, and using sufficient ammonium hydroxide to provide a solution having a pH of 8.0, the copolymer of Example 1 has been dissolved to form a viscous water solution which will flow at room temperature containing 65% by weight of resin solids. Using the 50% half-ester of Example 2, a flowable solution containing 70% by weight of resin solids has been made. Using the 100% half-ester of Example 2, flowable solutions containing from 70–75% by weight of resin solids have been made. In contrast, and using copolymer of conventional high molecular weight, it is difficult to prepare aqueous alkaline solutions above 40% by weight.

The water solutions of Example 6 are useful as coatings, forming water resistant films useful as can coatings, in floor polishes which deposit scrubbable films, and for many other purposes as will be indicated hereinafter. In contrast, the conventional copolymers of styrene and maleic anhydride are fare more difficult to esterify and the esters are far less soluble in aqueous alkaline medium than are those of the invention. Thus, the invention enables the formulation of aqueous solutions of far higher solids content than could be obained heretofore and thicker and more resistant coatings can be produced therefrom. Even in dilute solution, the products of the invention are superior to those known heretofore, for the new products have greatly increased penetrating power with respect to porous surfaces. Numerous other important advantages are also obtained such as greatly improved pigment wetting and superior compatibility with other resins in solution.

The 50% half-ester of Example 2 is highly reactive with respect to hydroxyl functionality and can be easily and extensively cross-linked by reaction with polyhydric alcohols such as glycols forming thermoset products. The 100% half-ester of Example 2 and the 125% half-ester of Example 3 provide water resistant thermoplastic films in the absence of glycol cross-linking and, indeed, are relatively inert to hydroxyl functionality in the absence of catalysts.

*Example 7*

25 parts of the 150% half-ester of Example 4 are agitated with 75 parts of water containing 2 mols of ammonium hydroxide per equivalent of carboxyl functionality remaining in the partially esterified copolymer, the aqueous medium being heated to 50° C. and diluted with additional water to facilitate dissolving of the copolymer. The partially esterified copolymer has limited solubility and dilute water solutions are formed.

*Example 8*

A copolymer containing an unusually large proportion of styrene is made by copolymerizing one mole of maleic anhydride with 2 mols of styrene in the presence of an organic peroxide catalyst. The equipment used in this copolymerization is a 2-liter resin kettle fitted with an electric heating mantle, reflux condenser, thermometer, stirrer and separatory funnel.

To carry out the copolymerization, 633 milliliters of p-cymene are added to the resin kettle and heat is applied to bring the p-cymene to reflux temperature (boiling point 176° C.). Then a previously prepared "Solution A" is added to the resin kettle by incremental addition through the separatory funnel over a period of one hour. Enough heat is applied to the reaction mixture by means of the heating mantle to maintain the reaction temperature at 175–176° C. "Solution A" is maintained at 40–50° C. during the one hour addition period.

"Solution A" is prepared by dissolving 122.75 grams of maleic anhydride in 710 milliliters of p-cymene at 60° C. After filtering, 262 grams of styrene and 12 grams of benzoyl peroxide are added to provide the final "Solution A."

During the addition of "Solution A," a molten mass of copolymer product forms in the kettle. When addition of "Solution A" is complete, the reaction mixture is allowed to cool and additional anhydride copolymer crystallizes out of the solvent phase. The solvent is distilled off leaving a mass of solid copolymer which is mortar mixed, washed with petroleum ether, and then suction filtered. This procedure is repeated until additional purification removes no further solvent. The washed copolymer is then dried in an oven at 110–120° C. The yield is at least stoichiometric indicating complete incorporation of styrene in the copolymer product.

The styrene-maleic anhydride copolymer product made by the above procedure has the following analyses:

Solution viscosity (10% solution in acetone),
    centistokes at 30° C. _____ 0.721
Melting range _____° C__ 150–155
Acid number _____ 365

The fact of complete solubility of the copolymer product in aqueous alkaline medium as well as the acid number of the copolymer establishes the absence of styrene homopolymer and the production of a copolymer containing styrene and maleic anhydride in mol proportions of 2:1.

The copolymerization described in Example 8 was repeated a number of times to provide the following average data:

Solution viscosity (10% solution in acetone),
  centistokes at 30° C. _____ 0.70–0.73
Melting range _____° C__ 145–155
Acid number _____ 365–370

*Example 9*

The 100% half-ester is prepared by mixing one anhydride equivalent of the copolymer of Example 8 and 1 mol of butyl Cellosolve with 2.4 gram. $LiC_2H_3O_2 \cdot 2H_2O$ in a 2-liter resin kettle fitted with a stirrer and reflux condenser. The mixture is heated in an oil bath at 175° C. for 2 hours. The resulting ester is then sparged with nitrogen for approximately 10 minutes. After cooling, the 100% half-ester is ground to a free-flowing powder.

*Example 10*

The 125% half-ester of the copolymer of Example 8 and butyl Cellosolve may be prepared by mixing 1.0 anhydride equivalent of the copolymer of Example 8 and 1.25 mols butyl Cellosolve with 2.62 grams $$LiC_2H_3O_2 \cdot 2H_2O$$

in a 2-liter resin kettle fitted with a stirrer and reflux condenser. The mixture is heated in an oil bath at 175° C. for 2 hours. The resulting ester is then sparged with nitrogen for approximately 10 minutes. After cooling, the 125% half-ester is ground to a powder.

*Example 11*

25 parts of the 100% half-ester of Example 9 are agitated in 75 parts of water containing 1 mol of ammonium hydroxide per equivalent of carboxyl functionality remaining in the partially esterified copolymer. The mixture is heated to 50° C. and agitation is continued until the partially esterified copolymer powder is dissolved to provide a 25% by weight solution.

*Example 12*

20 parts of the 125% half-ester of Example 10 are agitated with 80 parts of water containing 2 mols of ammonium hydroxide per equivalent of carboxyl functionality remaining in the partially esterified copolymer, the aqueous medium being heated to 50° C. to facilitate dissolving of the copolymer. The partially esterified copolymer does not dissolve to any substantial extent.

*Example 13*

A copolymer is prepared by copolymerizing 1 mol of maleic anhydride with 3 mols of styrene in the presence of an organic peroxide catalyst. The equipment used in this copolymerization is a 2-liter resin kettle fitted with an electric heating mantle, reflux condenser, thermometer, stirrer and separatory funnel.

To carry out the copolymerization, 633 milliliters of p-cymene are added to the resin kettle and heat is applied to bring the p-cymene to reflux temperature (boiling point 176° C.). Then a previously prepared "Solution A" is added to the resin kettle by incremental addition through the separatory funnel over a period of one hour. Enough heat is applied to the reaction mixture by means of the heating mantle to maintain the reaction temperature at 175–176° C. "Solution A" is maintained at approximately 40° C. during the one hour addition period.

"Solution A" is prepared by dissolving 122.75 grams of maleic anhydride in 710 milliliters of p-cymene at 60° C. After filtering, 393 grams of styrene and 12 grams of benzoyl peroxide are added to provide the final "Solution A."

During the addition of "Solution A," a copolymer product is formed substantially instantaneously, and remains in solution. When addition of "Solution A" is complete, the reaction mixture is allowed to cool and styrene-maleic anhydride copolymer crystallizes in part out of the solvent phase. The solvent is distilled off, leaving a mass of solid copolymer which is mortar mixed, washed with petroleum ether, and then suction filtered. This procedure is repeated until additional purification removes no further solvent. The washed copolymer is then dried in an oven at 110–120° C. The yield is at least stoichiometric indicating complete incorporation of styrene in the copolymer product in a mol ratio of 3:1.

The styrene-maleic anhydride copolymer product made by the above procedure has the following analyses:

Solution viscosity (10% solution in acetone),
  centistokes at 30 C. _____ 0.801
Melting range _____° C__ 130–135
Acid number _____ 275

The complete solubility of the copolymer product in aqueous alkaline medium and its acid number establish the absence of styrene homopolymer and the production of a copolymer containing styrene and maleic anhydride in molar proportions of 3:1.

The copolymerization described in Example 13 was repeated a number of times to provide the following average data:

Solution viscosity (10% solution in acetone),
  centistokes at 30° C. _____ 0.8–0.84
Melting range _____° C__ 125–135
Acid number _____ 270–280

*Example 14*

The 50% half-ester is prepared by mixing one anhydride equivalent of the copolymer of Example 13 and 0.5 mol of butyl Cellosolve in a 2-liter resin kettle fitted with a stirrer and reflux condenser. The mixture is heated in an oil bath at 150° C. for 2 hours. The resulting ester is then sparged with nitrogen for approximately 10 minutes. After cooling, the 50% half-ester is ground to a free-flowing powder.

*Example 15*

The 100% half-ester is prepared by mixing 1.0 anhydride equivalent of the copolymer of Example 13 and 1.0 mol of butyl Cellosolve with 2.4 grams $LiC_2H_3O_2 \cdot 2H_2O$ in a 2-liter resin kettle fitted with a stirrer and reflux condenser. The mixture is heated in an oil bath at 175° C. for 2 hours. The resulting ester is then sparged with nitrogen for approximately 10 minutes. After cooling, the 100% half-ester is ground to a free-flowing powder.

*Example 16*

20 parts of the 50% half-ester of Example 14 are agitated with 80 parts of water containing 1 mol of ammonium hydroxide per equivalent of carboxyl functionality remaining in the partially esterified copolymer. The mixture is heated to 50° C. and agitation is continued until the partially esterified copolymer powder is dissolved to provide a 20% by weight solution.

*Example 17*

15 parts of the 100% half-ester of Example 15 are agitated with 85 parts of water containing 2 mols of ammonium hydroxide per equivalent of carboxyl functionality remaining in the partially esterified copolymer, the aqueous medium being heated to 50° C. to facilitate dissolving of the copolymer. The partially esterfied copolymer does not dissolve to any substantial extent.

*Example 18*

Examples 6, 7, 11, 12, 16, and 17 are repeated using corresponding proportions of sodium hydroxide in place of ammonium hydroxide. Corresponding results are obtained.

Repeating Examples 2–7, 9–12, and 14–18, inclusive, using n-butanol, isobutanol, butyl Carbitol, dodecyl alcohol and isooctyl alcohol in place of butyl Cellosolve provides substantially the same results.

The water solutions of copolymer partial esters in accordance with the invention are capable of diverse and important utility. To illustrate this utility, the 100% ethanol half-ester of the copolymer of Example 1 is useful in hair sprays, solution being effected through the use of ammonia. The water solutions of Example 6 and Example 11 are useful in combination with wax in the production of floor polishes. These floor polishes, by virtue of the water resistance of the copolymer partial esters of the invention, are unusual in that they do not water spot and can be removed with household ammonia. Moreover, the water solutions of the invention, as typified by the solutions of Examples 6 and 11, are useful as a protective colloid in emulsion coating compositions where they may be used in amounts of from 1–40%. In this capacity, the solutions of the invention may be used with aqueous emulsions in which the dispersed film-forming particles are copolymers of butadiene and styrene, acrylic copolymers, or polyvinyl acetate. The water solutions of the invention also find utility in the coating of paper and as thickening agents to give body to aqueous solutions of organic compounds. The sodium hydroxide solutions corresponding to the ammonium hydroxide solutions of Examples 6 and 11 are also useful as additives to a paper furnish to provide a valuable sizing for the paper fibers.

While the foregoing will serve to illustrate the unusual diversity of important utility achieved by the water solutions of the invention, it should be understood that these utilities are merely illustrative and the listing is by no means complete.

*Example 19*

Following the procedure of Example 5, 1.0 mol of the anhydride copolymer of Example 1 was esterified with 2.0 mols of methoxy polyethylene glycol having a molecular weight of approximately 350 to produce the bis-ester. In the same manner, the bis-esters were produced from the anhydride copolymers of Examples 8 and 13. The bis-ester produced using the copolymer of Example 1 was soluble in water at a concentration of 70% by weight. The bis-esters of the copolymers of Examples 8 and 13 were soluble in water at a concentration of 50%. In contrast, and using a 1:1 copolymer of styrene and maleic anhydride of minimum conventional high molecular weight, e.g., having a viscosity in 10% solution in acetone of 8.0 centistokes, the bis-ester formed with methoxy polyethylene glycol was not soluble in water or in ammonium hydroxide solution as is evidenced by the fact that a 2% by weight solution could not be made.

The esterification process which is employed in accordance with the invention in order to provide the extensive esterification required, without the need for purification, involves the use of metal fatty acid salts. While any metal may be selected, the alkali metals are preferred. Thus, lithium acetate, sodium acetate and potassium acetate are particularly preferred. The particular fatty acid used to form the fatty acid salt is not of primary significance. Thus, the corresponding hexoate or octoate are also useful. While the alkali metal salts are particularly preferred, other metals may be used, especially zinc and aluminum, such as zinc acetate and aluminum acetate.

The invention is defined in the claims which follow.

I claim:
1. A method of esterifying copolymers of monovinyl aromatic compound and maleic compound with monohydroxy organic compound to provide an at least partially esterified copolymer, comprising subjecting a mixture of said copolymer and at least sufficient alcohol to provide the desired esterification to elevated temperature in the liquid phase in the presence of a catalytic amount of a metal fatty acid salt in which said metal is selected from the group consisting of alkali metals, zinc and aluminum.

2. A method as recited in claim 1 in which said salt is alkali metal acetate.

3. A method as recited in claim 1 in which said salt is lithium acetate.

4. Copolymer partial esters possessing extensive solubility in aqueous alkaline medium at a pH of from 7–9 comprising copolymer of styrene and maleic anhydride in molar proportions of from 1:1 to 3:1 and containing at least two anhydride groups per molecule, the anhydride groups of said maleic anhydride being partially esterified to an extent of from 10% to 145% of half esterification with an alkoxy alkanol having 2–12 carbons in the alkoxy group and from 2–6 carbons in the alkanol group, the unesterified copolymer having a solution viscosity measured at 30° C. in 10% solution in acetone of up to 1.0 centistoke.

5. Copolymer partial esters as recited in claim 4 in which said alcohol is butyl Cellosolve.

6. Copolymer partial esters as recited in claim 4 in which said copolymer contains styrene and maleic anhydride in molar proportions of substantially 1:1.

7. A water solution comprising water containing a monovalent base selected from the group consisting of ammonium hydroxide, lower alkyl-substituted derivatives of ammonium hydroxide, lower alkyl amines, alkali metal hydroxides and salts of said bases which act as bases in aqueous medium, and having dissolved therein copolymer partial esters as defined in claim 4.

8. A water solution as recited in claim 7 in which said alkaline material is a volatile nitrogenous base.

References Cited

UNITED STATES PATENTS

| | | | |
|---|---|---|---|
| 2,442,558 | 6/1948 | D'Alelio | 260—78.5 |
| 2,570,861 | 10/1951 | Roedel | 260—78.5 |
| 2,606,891 | 8/1952 | Rowland | 260—78.5 |
| 2,607,762 | 8/1952 | Bowen | 260—78.5 |
| 2,806,046 | 9/1957 | Tess | 260—410.7 |
| 2,866,771 | 12/1958 | Sellers | 260—78.5 |
| 2,971,939 | 2/1961 | Baer | 260—78.5 |
| 3,207,718 | 9/1965 | Zimmerman et al. | 260—78.5 |

OTHER REFERENCES

"Chemical Engineering Series," edited by P. H. Groggins, McGraw-Hill Book Co., Inc., New York, 1958, p. 702 and p. 711 relied on.

JOSEPH L. SCHOFER, *Primary Examiner.*

L. WOLF, J. KIGHT, *Assistant Examiners.*